US007617117B2

(12) United States Patent
Starkey

(10) Patent No.: US 7,617,117 B2
(45) Date of Patent: Nov. 10, 2009

(54) USING A COMPLEXITY MATRIX FOR ESTIMATION

(75) Inventor: James Gilbert Starkey, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1327 days.

(21) Appl. No.: 10/392,800

(22) Filed: Mar. 19, 2003

(65) Prior Publication Data

US 2004/0186757 A1 Sep. 23, 2004

(51) Int. Cl.
*G06F 9/44* (2006.01)
(52) U.S. Cl. ........................................................ 705/7
(58) Field of Classification Search ...................... 705/7
See application file for complete search history.

(56) References Cited

U.S. PATENT DOCUMENTS

| | | | | |
|---|---|---|---|---|
| 5,586,022 A | * | 12/1996 | Arimoto et al. | 700/97 |
| 5,701,471 A | | 12/1997 | Subramanyam | |
| 5,815,638 A | * | 9/1998 | Lenz et al. | 706/15 |
| 5,907,488 A | * | 5/1999 | Arimoto et al. | 700/97 |
| 6,219,654 B1 | | 4/2001 | Ruffin | |
| 6,223,092 B1 | | 4/2001 | Miyakawa et al. | |
| 6,249,769 B1 | | 6/2001 | Ruffin et al. | |
| 6,434,438 B1 | | 8/2002 | Jin et al. | |
| 6,453,269 B1 | | 9/2002 | Quernemoen | |
| 6,651,244 B1 | * | 11/2003 | Smith et al. | 717/154 |
| 6,658,643 B1 | * | 12/2003 | Bera | 717/101 |
| 6,810,401 B1 | * | 10/2004 | Thompson et al. | 707/101 |
| 7,412,430 B1 | * | 8/2008 | Moore | 706/46 |
| 2003/0033586 A1 | * | 2/2003 | Lawler | 717/101 |
| 2003/0055702 A1 | * | 3/2003 | Waterston | 705/8 |

OTHER PUBLICATIONS

Boehm, Barry W.; Abts, Chris; Brown, A. Winsor; Chulani, Sunita; Clark, Bradford K.; Horowitz, Ellis; Madachy, Ray; Reifer, Donald; Steece, Bert. "Software Cost Estimation with Cocomo II". 2000. Prentice Hall.*
Hantos, Peter. "Software Estimation Experiences at Xerox". Oct. 24-27, 2000. 15th International Forum on COCOMO and Software Cost Estimation.*

(Continued)

*Primary Examiner*—Jonathan G. Sterrett
*Assistant Examiner*—Peter Choi
(74) *Attorney, Agent, or Firm*—Stephen J. Walder, Jr.; William H. Steinberg

(57) ABSTRACT

Mechanisms are provided for estimating requirements for completion of a project. These mechanisms, which may be implemented by a data processing system, define general project factors for a general kind of project as well as analysis rules for this general kind of project. A complexity matrix that defines a plurality of complexity measures for a plurality of project factors for a specific project is provided. The analysis rules are applied to the project factors of the complexity matrix to generate a single complexity measure for the specific project. This complexity measure is used by an estimation mechanism to generate an estimate of requirements for completing the project. Exceptional combinations of project factors may be defined to force the single complexity measure to a maximum value when the conditions of the exceptional combinations are met by the complexity measures of the complexity matrix for a specific project.

15 Claims, 6 Drawing Sheets

OTHER PUBLICATIONS

Clark, Bradford; Devnani-Chulani, Sunita; Boehm, Barry. "Calibrating the COCOMO II Post-Architecture Model". Apr. 1998. 20th International Conference on Software Engineering.*

Feuche, Mike. "Attention is Being Generated by Complexity Metrics Tools". Feb. 29, 1988. MIS Week. vol. 9, Issue 9.*

Benyahia, Hadj. "Costs and Productivity Estimation in Computer Engineering Economics". Spring 1996. The Engineering Economist. vol. 41, Issue 3.*

Gidado, K.I. "Project Complexity: The Focal Point of Construction Production Planning". Jan. 4, 1996. Construction Management and Economics. vol. 14.*

Kim, Jongbae; Wilemon, David. "Sources and Assessment of Complexity in NPD Projects". Jan. 2003. R&D Management. vol. 33, Issue 1.*

Smith, Preston G.; Reinertsen, Donald G. "Shortening the Product Development Cycle". May/Jun. 1992. Research Technology Management. vol. 35, Issue 3.*

Banker, Rajiv D.; Datar, Srikant M.; Kemerer, Chris F.; Zweig, Dani. "Software Complextiy and Maintenance Costs". Nov. 1993. Communications of the ACM. vol. 36, Issue 11.*

Ernest-Jones, Terry. "How Long is a Piece of Software?". Feb. 8, 1990. Computer Weekly. Issue 1200.*

Kim, Yongbeom; Stohr, Edward A. "Software Reuse: Survey and Research Directions". Spring 1998. Journal of Management Information Systems. vol. 14, Issue 4.*

"COCOMO II Model Definition Manual". USC Center for Software Engineering. Oct. 2, 1998.*

Lima, Osias de Souza, Junior; Farias,Pedro Porfirio Muniz; Belchior, Arnaldo Dias. "A Fuzzy Model for Function Point Analaysis to Development and Enhancement Project Assessments". 1999. CLEI Electronic Journal. vol. 5, Issue 2.*

Menzies, Tim; Raffo, David; Setamanit, Siri-on; Hu, Ying; Tootoonian, Sina. "Model-Based Tests of Truisms". 2002. Proceedings of the 17th IEEE International Conference on Automated Software Engineering.*

Oriogun, Peter K. "A Survey of Boehm's Work on the Spiral Models and COCOMO II—Towards Software Development Process Quality Improvement". 1999. Software Quality Journal. vol. 8.*

Kaiser, Javaid. "Identification of Factors That Affect Software Complexity". Dec. 1985.*

* cited by examiner

*FIG. 4*

Complexity Matrix 361 362

| | Selection |
|---|---|
| Sites per Day 301 | 9 to 15 322 ▽ |
| Rollout Schedule 302 | Continuous 323 ▽ |
| Implementation Type 303 | Geo Progressive 324 ▽ |
| Ease of Client Issue Resolution 304 | Good 325 ▽ |
| Dedicated Installers 305 | No 326 ▽ |
| Ease of Equip Installation 306 | Medium 327 ▽ |
| No. of HW & SW Vendors 307 | 2 to 3 ▽ |
| Major Services 308 | |
|    Solution Validation Lab 309 | ☐ |
|    Site Surveys 310 | ☑ — 331 |
|    Site Preparation 311 | ☑ — 332 |
|    Equipment Procurement 312 | ☑ — 333 |
|    Equipment Logistics 313 | ☑ — 334 |
|    Integration Center Services 314 | ☐ — 335 |
|    Extensive Training 315 | ☐ — 336 |
| PC/Server Factors 316 | — 337 |
|    Type of PC Rollout 317 | ▽ — 338 |
|    Seats & Sites 318 | ▽ — 339 |
|    # Gold Images 319 | ▽ — 340 |
|    Industry/Client Specific SW 320 | ▽ — 341 |
|    End User Data Migration 321 | ▽ — 342 |
| Project Complexity Rating | Moderate — 380 |

371: rows 301–307
372: rows 308–315
373: rows 316–321

*FIG. 5*

| Complexity Matrix | | Selection |
|---|---|---|
| Sites per Day | 301 | 16 or more  322 ▽ |
| Rollout Schedule | 302 | Continuous  323 ▽ |
| Implementation Type | 303 | Geo Progressive  324 ▽ |
| Ease of Client Issue Resolution | 304 | Excellent  325 ▽ |
| Dedicated Installers | 305 | No  326 ▽ |
| Ease of Equip Installation | 306 | Complex  327 ▽ |
| No. of HW & SW Vendors | 307 | 2 to 3 ▽ |
| Major Services | 308 | |
|    Solution Validation Lab | 309 | ☑ |
|    Site Surveys | 310 | ☑ — 331 |
|    Site Preparation | 311 | ☑ — 332 |
|    Equipment Procurement | 312 | ☑ — 333 |
|    Equipment Logistics | 313 | ☑ — 334 |
|    Integration Center Services | 314 | ☐ — 335 |
|    Extensive Training | 315 | ☐ — 336 |
| PC/Server Factors | 316 | — 337 |
|    Type of PC Rollout | 317 | ▽ — 338 |
|    Seats & Sites | 318 | ▽ — 339 |
|    # Gold Images | 319 | ▽ — 340 |
|    Industry/Client Specific SW | 320 | ▽ — 341 |
|    End User Data Migration | 321 | ▽ — 342 |

371 { rows 301–307 }
372 { rows 308–315 }
373 { rows 316–321 }

Project Complexity Rating: High ~380

USING A COMPLEXITY MATRIX FOR ESTIMATION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to information handling, and more particularly to handling information that is usable in an estimation process.

BACKGROUND OF THE INVENTION

Those providing services, or delivering a mixture of goods and services, need to estimate accurately the resources and effort required to complete a specific project. This concerns the estimated cost to the provider of completing a project, which is distinct from the price that a customer or client will pay for receiving the benefit of the completed project. This problem is not addressed by other estimation examples that focus on different matters.

In various fields, estimating guidance exists in the form of general information, and a general-purpose estimating process that utilizes that information. However, it may be difficult to adapt and use such an estimation process, for obtaining accurate estimates for specific projects. Thus there is a need for a tool to bridge the gap between a general, abstract estimation process and particular projects.

SUMMARY OF THE INVENTION

An example of a solution to problems mentioned above comprises receiving project-characteristic inputs for a project, receiving major-services inputs for the project, applying analysis rules to the inputs, and outputting, for the project, at least one complexity measure that is usable in an estimation process.

BRIEF DESCRIPTION OF THE DRAWINGS

A better understanding of the present invention can be obtained when the following detailed description is considered in conjunction with the following drawings. The use of the same reference symbols in different drawings indicates similar or identical items.

FIG. 4 is a diagram showing another example of a user interface for a complexity matrix, including some major-services inputs, and a resulting output.

FIG. 5 is a diagram showing another example of a user interface for a complexity matrix, including some alternative values for inputs, and a resulting output.

DETAILED DESCRIPTION

Figure 1:
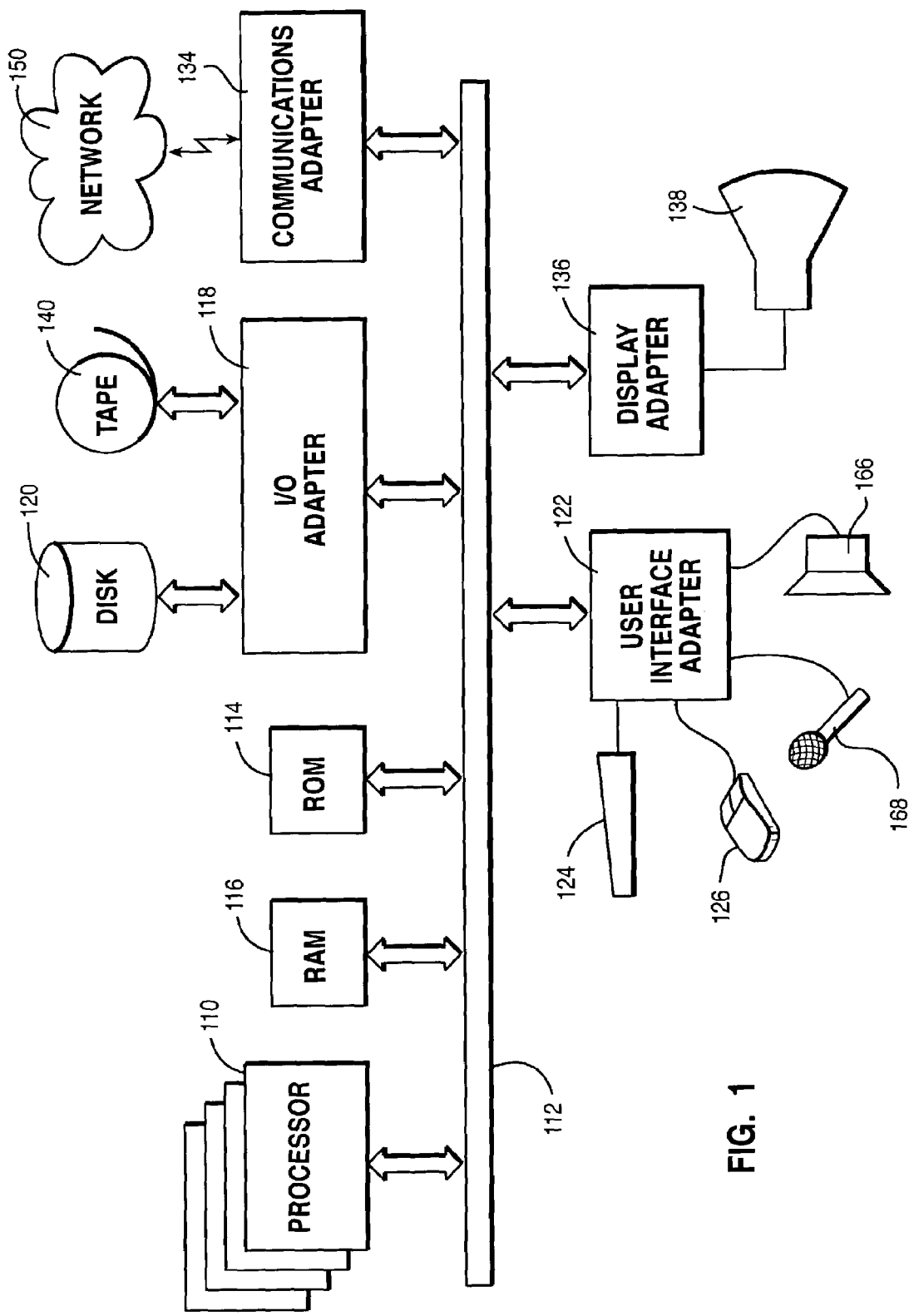
FIG. 1 illustrates a simplified example of a computer system capable of performing the present invention.

The examples that follow involve the use of one or more computers and may involve the use of one or more communications networks. The present invention is not limited as to the type of computer on which it runs, and not limited as to the type of network used. The present invention is not limited as to the type of medium or format used for input and output. These may include sketching diagrams by hand on paper, printing images or numbers on paper, displaying images or numbers on a screen, or some combination of these, for example. A model of a solution might be provided on paper, and later the model could be the basis for a design implemented via computer, for example.

The following are definitions of terms used in the description of the present invention and in the claims:

"About," with respect to numbers, includes variation due to measurement method, human error, statistical variance, rounding principles, and significant digits.

"Application" means any specific use for computer technology, or any software that allows a specific use for computer technology.

"Availability" means ability to be accessed or used.

"Client-server application" means any application involving a client that utilizes a service, and a server that provides a service. Examples of such a service include but are not limited to: information services, transactional services, access to databases, and access to audio or video content.

"Comparing" means bringing together for the purpose of finding any likeness or difference, including a qualitative or quantitative likeness or difference. "Comparing" may involve answering questions including but not limited to: "Does a given item or combination match any element of a set of known items or combinations?" Or "Is a measured value greater than a threshold value?"

"Complexity measure" means any evaluation of difficulty or complication.

"Component" means any element or part, and may include elements consisting of hardware or software or both.

"Computer-usable medium" means any carrier wave, signal or transmission facility for communication with computers, and any kind of computer memory, such as floppy disks, hard disks, Random Access Memory (RAM), Read Only Memory (ROM), CD-ROM, flash ROM, non-volatile ROM, and non-volatile memory.

"Exceptional combination" means any association, coincidence, set or grouping that is significant for its effect on complexity, cost, difficulty, or resource requirements.

"Major service" means a service, significant for its potential effect on complexity, cost, difficulty, or resource requirements, that may be part of a project in some cases.

"Mapping" means associating, matching or correlating.

"Measuring" means evaluating or quantifying; the result may be called a "Measure" or "Measurement".

"Output" or "Outputting" means producing, transmitting, or turning out in some manner, including but not limited to printing on paper, or displaying on a screen, writing to a disk, or using an audio device.

"Project" means any assignment, enterprise, job, undertaking or venture, in any industry or profession; for example, it may involve providing services, or a mixture of goods and services.

"Project characteristic" means a factor, feature, or quality that is significant for its potential effect on complexity, cost, difficulty, or resource requirements, or a distinguishing feature that may separate one specific project from another.

"Project parameter" means a constraint, fact, quantity, or piece of data associated with a project, or a category for such a constraint, fact, quantity, or piece of data.

"State" means any set of stored data at some point in time.

"Statistic" means any numerical measure calculated from a sample.

"Storing" data or information, using a computer, means placing the data or information, for any length of time, in any kind of computer memory, such as floppy disks, hard disks, Random Access Memory (RAM), Read Only Memory (ROM), CD-ROM, flash ROM, non-volatile ROM, and non-volatile memory.

"Threshold value" means any value used as a borderline, standard, or target; for example, a "threshold value" may be derived from an agreement, experimentation, personal experience, industry norms, or other sources.

FIG. 1 illustrates a simplified example of an information handling system that may be used to practice the present invention. The invention may be implemented on a variety of hardware platforms, including embedded systems, personal computers, workstations, servers, and mainframes. The computer system of FIG. 1 has at least one processor 110. Processor 110 is interconnected via system bus 112 to random access memory (RAM) 116, read only memory (ROM) 114, and input/output (I/O) adapter 118 for connecting peripheral devices such as disk unit 120 and tape drive 140 to bus 112. The system has user interface adapter 122 for connecting keyboard 124, mouse 126, or other user interface devices such as audio output device 166 and audio input device 168 to bus 112. The system has communication adapter 134 for connecting the information handling system to a communications network 150, and display adapter 136 for connecting bus 112 to display device 138. Communication adapter 134 may link the system depicted in FIG. 1 with hundreds or even thousands of similar systems, or other devices, such as remote printers, remote servers, or remote storage units. The system depicted in FIG. 1 may be linked to both local area networks (sometimes referred to as intranets) and wide area networks, such as the Internet.

While the computer system described in FIG. 1 is capable of executing the processes described herein, this computer system is simply one example of a computer system. Those skilled in the art will appreciate that many other computer system designs are capable of performing the processes described herein.

Figure 2:
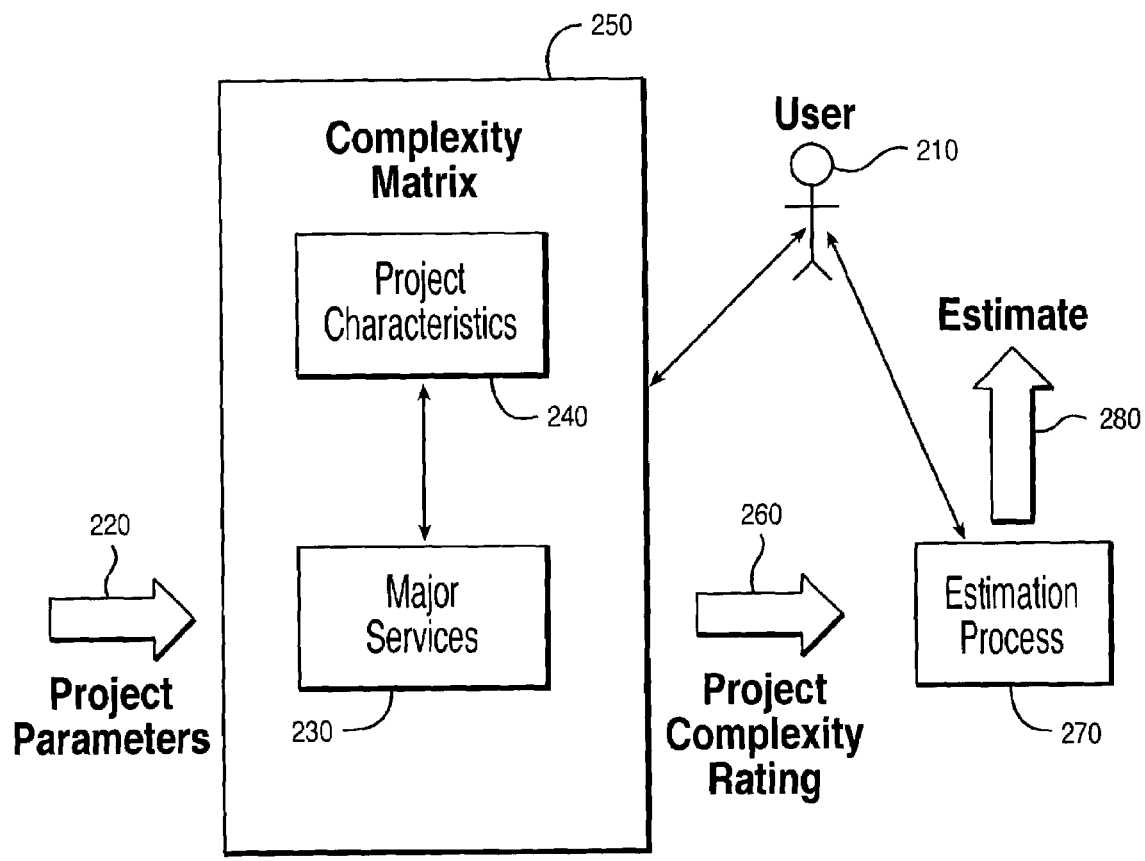
FIG. 2 is a block diagram showing an example of a system and method for estimating.

FIG. 2 is a block diagram showing an example of a system and method for estimating. In FIG. 2, complexity matrix 250 symbolizes a means for receiving project-characteristic inputs, and major-services inputs, for a project. Complexity matrix 250 may be implemented at least in part with software running on a computer, or with printed instructions or a printed paper form, used with a hand-held calculator and pencil, for example. The double-headed arrow, connecting user 210 with complexity matrix 250, symbolizes interactions between user 210 and complexity matrix 250. For example, complexity matrix 250 may give output to, and receive input from, user 210. Input devices such as keyboard, mouse, touch-sensitive screen, or microphone may be used (see also FIGS. 3-5). One particular kind of input that might be used in some cases, project parameters, are symbolized by arrow 220 (see also Tables 1 and 2, below). Project parameters 220 and other inputs may come directly from user 210, or from another source, such as stored data for a project.

Complexity matrix 250 symbolizes a means for applying analysis rules to the project-characteristic inputs, and major-services inputs, to yield at least one complexity measure 260 that describes a project. The double-headed arrow, connecting project characteristics 240 and major services 230, symbolizes that analysis rules may reflect ways in which project characteristics 240 and major services 230 interact and affect a complexity measure. Within project characteristics 240 and major services 230 are components of a project. Each individual component or item is assigned a score, from a range of possible scores, that reflects an item's difficulty. Thus complexity matrix 250 symbolizes a means for utilizing a range of scores that reflect an item's difficulty. Scores are combined, according to analysis rules, to yield at least one complexity measure 260 for a project, from a range of possible complexity measures. Thus complexity matrix 250 symbolizes a means for utilizing a range of complexity measures.

Complexity matrix 250 symbolizes a means for outputting at least one complexity measure (arrow 260) that is usable in an estimation process (shown at 270), to yield an estimate (arrow 280). The double-headed arrow, connecting user 210 with complexity matrix 250, symbolizes interactions as mentioned above, including outputting at least one complexity measure to user 210. One or more complexity measures may be provided directly (arrow 260) to estimation process 270. A project complexity rating is one example of a complexity measure at 260.

The double-headed arrow, connecting user 210 with estimation process 270, symbolizes interactions between user 210 and estimation process 270. For example, estimation process 270 may receive input from user 210. Estimation process 270 may be implemented at least in part with software running on a computer, or with printed instructions or a printed paper form, used with a hand-held calculator and pencil, for example. Estimation process 270 and complexity matrix 250 may be implemented with software running on the same computer, or on different computers that communicate via a network, for example.

Estimation process 270 may include a database, or may be connected to an external database, that contains estimated times required to complete various activities or tasks. One example is a database of estimated times for completing various construction activities and phases. Complexity measure 260 may be used in an estimation process 270, to modify estimated times and to yield an estimate 280, for example. Estimate 280 symbolizes one or more estimates such as resources required to complete a project, time required to complete a project, or cost of completing a project. As another example, a database may provide estimation guidance for information-technology projects, in the form of a range of possible values, such as 20-120 hours to complete a project. Use of complexity matrix 250 and complexity measure 260 with an estimation process 270 enables this range to be reduced to a finite value that is more appropriate for a specific opportunity. This increases the accuracy of a cost estimate 280 on which a contract price may be based, for example.

Figure 3:
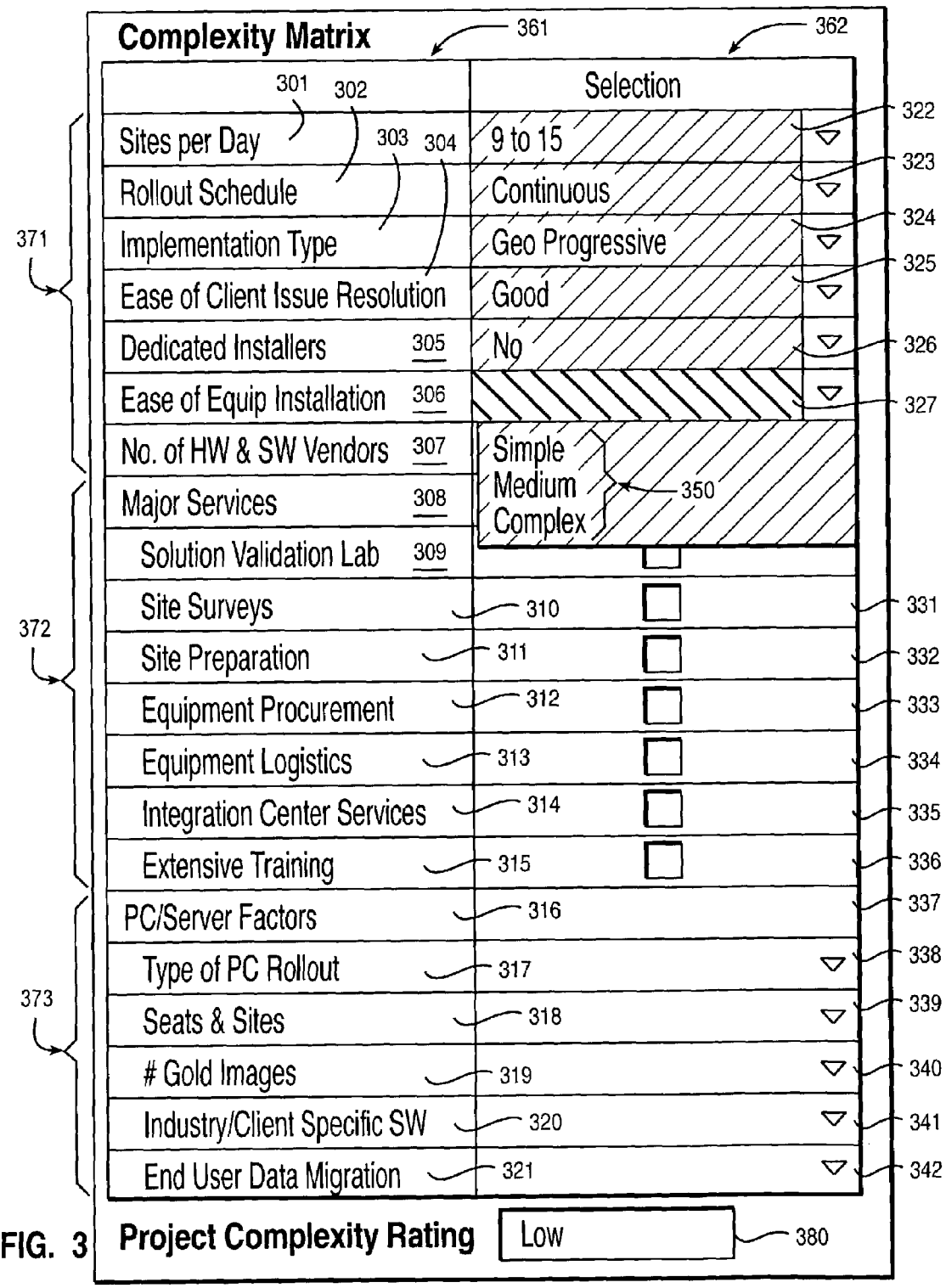
FIG. 3 is a diagram showing an example of a user interface for a complexity matrix, that is receiving a few inputs from a user.

Next, some general comments apply to the examples in FIGS. 3, 4, and 5. Project characteristics are shown at 371 and 373, and major services are shown at 372. In each of these categories, features are specific to the kind of project being estimated. A project characteristic at 371 or 373 is defined in these examples as one of a user-selectable range of values within a pull-down menu (see menu 350 in FIG. 3). A major service at 372 is binary in these examples; it is either within the scope of the contract (checked in the matrix) or not (unchecked). The examples in FIGS. 3-5 involve a complexity matrix for estimating computer hardware deployment (rollout) projects. Blocks 301 to 321 in column 361 provide descriptions and prompt a user to provide inputs. Blocks 322 to 342 in column 362 receive inputs from a user. Block 380 provides output.

FIG. 3 is a diagram showing an example of a user interface for a complexity matrix, that is receiving a few inputs from a user. It could be used with complexity matrix 250 in FIG. 2, for example. A complexity matrix and an interface like the one in FIG. 3 could be adapted to various kinds of projects. Developing a complexity matrix may involve defining, for a kind of project, project parameters, project characteristics, and major services. Some examples of project characteristics are shown at 371 and 373, and examples of major services are shown at 372. Some examples of project parameters are shown in Table 1 and Table 2.

TABLE 1

Project Parameters

|  | Selection |
|---|---|
| Rollout Type |  |
| PC/Server Rollout | ☐ |
| Blue on Blue | ☐ |
| OEM PC/Server Rollout | ☐ |
| Kiosk Deployment | ☐ |
| Network Equipment | ☐ |
| POS Deployment | ☒ |
| Retail Banking | ☐ |
| General Rollout | ☐ |
| Contract Duration (months) | 8 |
| Rollout Duration (months) | 5 |
| Total # sites (street addresses) | 1,500 |
| # Pilot sites | 30 |
| # Seats (laptops, PC's, servers) | 0 |
| # Subcontractors to be managed |  |
| # HW Vendors to be managed |  |
| IT Specialist installation | ☐ |
| Routers | 0 |
| Switches | 0 |
| Hubs, other network HW | 0 |

TABLE 2

Project Parameters

|  | Selection |
|---|---|
| Billable Travel |  |
| Project Kickoff Meeting | ☐ |
| Client Status Meetings | ☐ |
| Integration Center Used | ☐ |
| IBM Integration Center | ☐ |
| Network Modifications | ☐ |
| DOCS Admin Services | ☐ |
| DOCS Office at Client Site? | ☐ |
| Existing P&P Docs used for: |  |
| Integration Center | ☐ |
| Network Processes | ☐ |
| Site Survey & Site Prep | ☐ |
| Equipment Installation | ☐ |
| Training | ☐ |
| # Training Locations |  |
| IBM Sub Installing Cable? | ☐ |
| # FTE Days for Next-Day Support |  |
| TSS Installation? | ☐ |
| e-Deploy Used? | ☒ |
| IBM to Procure HW/SW? | ☐ |

Developing a complexity matrix may involve defining analysis rules for a kind of project. The example in FIG. 3 involves logic in the form of rules for analysis, or business rules, that are specific to the type of project being estimated. The purposes of the rules are to leverage intellectual capital pertaining to the type of project, and to ensure that project complexity is calculated consistently. These examples involve four kinds of rules:

1. Answer automation
2. Weighting
3. Complexity value calculation
4. Project complexity rating.

After a complexity matrix has been developed, using the complexity matrix may involve providing, for a specific project, project-parameter inputs, project-characteristic inputs, and major-services inputs, and applying the analysis rules to the inputs. Answer-automation rules may be used whenever possible to answer matrix questions on behalf of the user. In FIG. 3, answer-automation rules in the matrix may be invoked to answer the "Sites per Day" question at block 301. For example, a user interface or checklist similar to Table 1 and Table 2 may serve as a means for receiving, for a specific project, project-parameter inputs. The user, having already answered some questions in Table 1, has provided adequate information for the matrix to answer (in block 322) the "Sites per Day" question (at block 301) in FIG. 3. If the inferred value is a probable answer, such as in this illustration, the field is left active (e.g. this may be shown with a white background, or a lightly shaded background like the one in block 322), so the user can override the value. If the matrix answer is definite, the business rules will also deactivate the matrix field (e. this may be shown with a darkened gray background), preventing user modification. In other words, the example in FIG. 3 comprises receiving project-parameter inputs (see Table 1), applying answer-automation rules to the project-parameter inputs, and generating an answer ("9 to 15" at block 322) that may serve as one of the project-characteristic inputs or major-services inputs.

Consider another example of input from a user. Evaluation is provided in the form of a range of values in a pull-down menu 350 in FIG. 3. A user may choose one of these values to fill block 327, as input for a project characteristic called "Ease of Equipment Installation" at block 306.

Continuing with details of FIG. 3, using the complexity matrix may involve outputting, for a specific project, at least one complexity measure that is usable in an estimation process. Block 380 is a way of outputting, for a specific project, a complexity measure (here, a project complexity rating). In this example, the value for the rating is "low."

FIG. 4 is a diagram showing another example of a user interface for a complexity matrix, including some major-services inputs, and a resulting output. The example in FIG. 4 involves rules for weighting. Weighting serves two functions. Firstly, it establishes the relative difficulty of dealing with a specific project environment or characteristic, or difficulty of completing a certain service. Secondly, it considers the effects of a given project characteristic or service on other characteristics or services associated with the contract. In other words, the matrix is able to judge the difficulty or complexity of specific aspects of the project and how those aspects affect one another.

Consider how the matrix provides a basic evaluation of the characteristic or service. In this example, each project characteristic is scored according to a five-point scale of difficulty. "Simple" would be scored as one (1), "Medium" as three (3), and "Complex" as five (5). Some project characteristics, however, are binary. For example, "Dedicated Installers" (at block 305) can only be "Yes" (worth 1 point) or "No" (worth 3 points). A user selection, such as "Medium" (at block 327) for "Ease of Equipment Installation" (at block 306), is translated into a weighted numeric value (3, in this case).

Weighting is also performed for the Major Services portion of the matrix. Each service is usually given a score of one (1), if it is within the scope of the project (i.e. an obligation to provide the major service exists). Certain, more complex services, however, such as providing a Solution Validation Lab (at block 309), Site Preparation (at block 311), or integration center services (at block 314) are given a score of two (2). Doubling the score of a certain service reflects the complexity of that service. The scoring is performed automatically as either the user or the matrix selects which services will be included in the project. Thus, developing a complexity matrix may involve defining a range of scores that reflect an item's difficulty, and utilizing a complexity matrix may involve utilizing the range of scores. Of course, a range of scores other than the ones in this example could be defined and utilized for a different kind of project.

Continuing with some details of FIG. 4, here are examples of assigning a score toward the low end of the range of scores (e.g. one point on a five-point scale of difficulty). A score at the low end would be assigned if an implementation project characteristic (see block 303) has a state of "geographically progressive" rather than "randomly-dispersed" (see block 324). For example, the project may be installing new point-of-sale ("POS") hardware and software in a chain of stores. The project is easier to manage if the installation proceeds from one geographic region to a nearby region, rather than moving among widely dispersed locations. A score at the low end also would be assigned if a schedule project characteristic (see block 302) has a state of "continuous" rather than "start-stop" (see block 323). The project is easier to manage if the installation proceeds continuously, rather than stopping during the November-December holiday season, and then resuming in January.

Next, consider how to determine the Computed Complexity Value. The Major Services total score may be translated into a single entry on the five-point scale. This means that the list of Major Services at 372 is effectively treated as a single Project Characteristic. The complexity of providing all of the services required for a particular contract is considered in light of the complexity of the overall project characteristics.

The matrix sums the total score for all project characteristics. This value is known as the Computed Complexity Value (CCV). In this example, the CCV is a discrete value on a 40-point scale. Table 3 gives an example of how to determine the Computed Complexity Value for FIG. 4. A user interface or a report form similar to Table 3 could serve as a means for outputting a computed complexity value, or a project complexity rating, or both.

TABLE 3

| Item | Score |
|---|---|
| Major Services total score, translated into a single entry on the five-point scale | 5 |
| Sites per day: 9-15 | 3 |
| Rollout schedule: continuous | 1 |
| Implementation type: Geographically Progressive | 1 |
| Ease of client issue resolution: good | 3 |
| Dedicated installers?: no | 3 |
| Ease of equipment installation: medium | 3 |
| No. of HW & SW vendors: 2-3 | 3 |
| Computed Complexity Value | 22 |

The matrix converts the CCV into the Project Complexity Rating (Low, Moderate, or High complexity). The 40-point scale is divided into three (3) roughly equal ranges, and the matrix compares the CCV against these ranges to determine which the CCV falls into. The matrix then returns the appropriate project complexity rating value ("Moderate" in this example) as shown in block 380. (This assumes that three or more characteristics were not rated as complex; see FIG. 5.) Thus, developing a complexity matrix may involve defining a range of complexity measures, and utilizing a complexity matrix may involve utilizing a range of complexity measures. Of course, a range of complexity measures other than the ones in this example could be defined and utilized for a different kind of project.

FIG. 5 is a diagram showing another example of a user interface for a complexity matrix, including some alternative values for inputs, and a resulting output. This example involves exceptional combinations. Consider how the matrix examines the relationships between the applicable characteristics and services, and modifies the score, as appropriate. For example, suppose the equipment to be installed (see block 306) is complex or difficult to install (see block 327) and the installers are drawn as needed from a pool of available technical resources (not dedicated, see blocks 305 and 326). This situation means that the project management team would constantly be dealing with an untrained installation force. This situation is much more difficult than having a dedicated team of trained technicians install complex equipment. Thus the state of the installation process (see block 327) and the state of the installation team (dedicated or non-dedicated, see block 326) have a significant affect on each other. To account for this, the matrix modifies the value associated with non-dedicated installers from 3 (moderately complex) to 5 (complex). See Table 4 below. Rules throughout the matrix adjust the score accordingly, wherever such interactions (exceptional combinations) exist.

Thus, developing a complexity matrix may involve defining at least one exceptional combination that modifies an item's score. Utilizing a complexity matrix may involve finding an exceptional combination, and modifying a score (such as a score for an item involved in the exceptional combination; see blocks 305 and 326, and Table 4).

In the example in FIG. 5, the matrix performs a check to determine if three (3) or more factors are considered to be complex. In other words, is the number of project characteristics having scores at the high end of the range greater than or equal to a threshold value of 3? If so, the matrix automatically assigns the project a project complexity rating of "High." See block 380. This is an example of finding an exceptional combination, and forcing a complexity measure into the high end of the range.

Table 4 gives an example of how to determine the Computed Complexity Value for FIG. 5. A user interface or a report form similar to Table 4 could serve as a means for outputting a computed complexity value, or a project complexity rating, or both.

TABLE 4

| Item | Score |
|---|---|
| Major Services total score, translated into a single entry on the five-point scale | 5 |
| Sites per day: 16 or more | 5 |
| Rollout schedule: continuous | 1 |
| Implementation type: Geo Progressive | 1 |
| Ease of client issue resolution: Excellent | 1 |

TABLE 4-continued

| Item | Score |
| --- | --- |
| Dedicated installers?: no | 5 |
| Ease of equipment installation: complex | 5 |
| No. of HW & SW vendors: 2-3 | 3 |
| Computed Complexity Value | 26 |

Table 4 gives an example where a project complexity rating would be on the borderline between moderate and complex, according to the addition of the scores. (Assume a 40-point scale is divided into 3 roughly equal ranges. Then the border between moderate and complex is about 27.) However, the number of project characteristics having scores at the high end of the range is greater than or equal to a threshold value of 3, so the matrix automatically assigns the project a project complexity rating of "High," as seen in block 380 of FIG. 5.

In general, developing a complexity matrix may involve defining at least one exceptional combination that forces a complexity measure into the high end of the range of complexity measures. A range of complexity measures other than the ones in this example could be defined and utilized for a different kind of project. As another example, a rule could be stated like this: "force a complexity measure into the high end, if the number of project characteristics having scores at the high end of their range exceeds a threshold value of 5."

Figure 6:
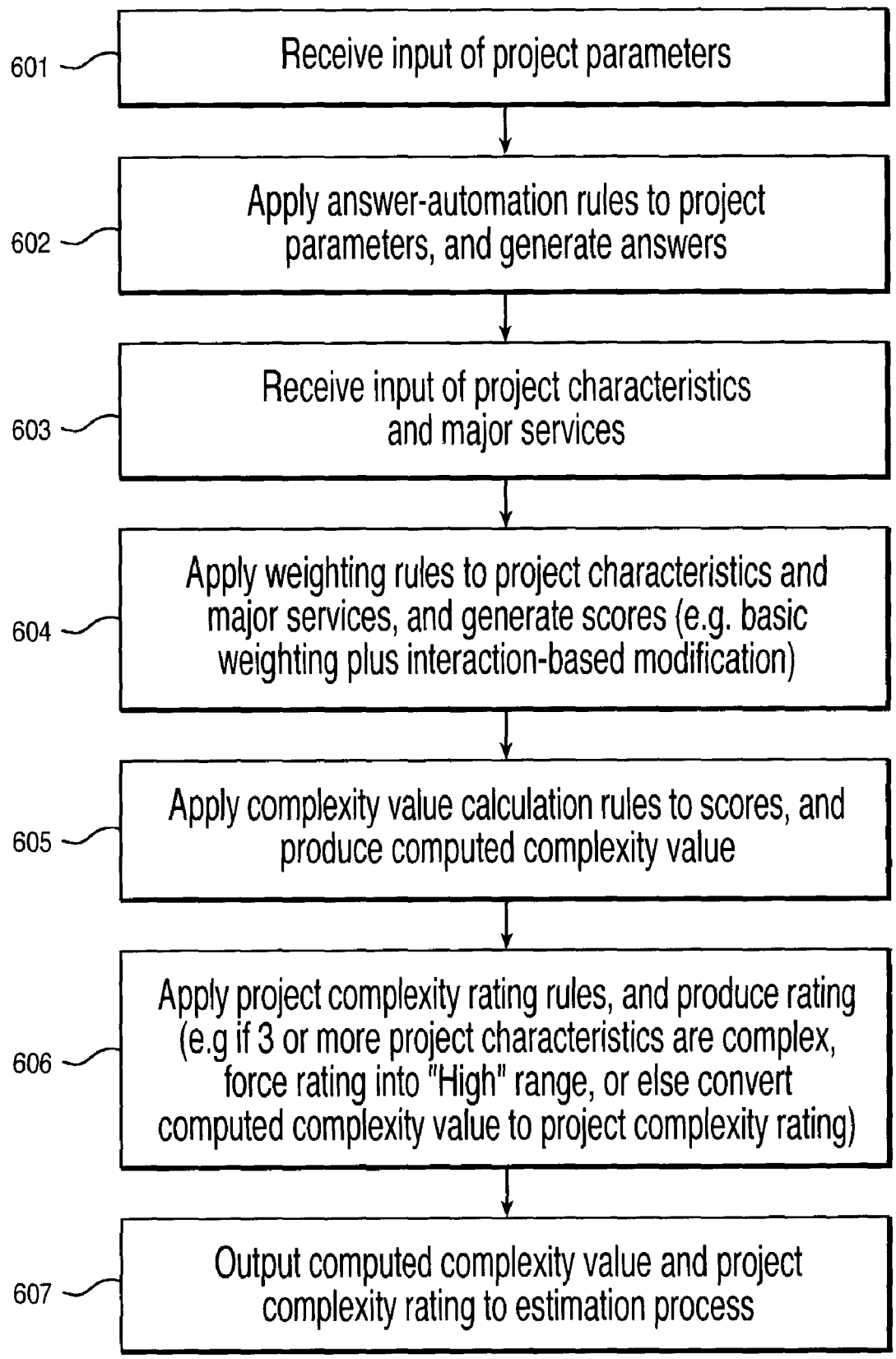
FIG. 6 is a flow chart showing an example of a process using a complexity matrix.

FIG. 6 is a flow chart showing an example of a process using a complexity matrix. The example in FIG. 6 begins at block 601, receiving input of project parameters. These project-parameter inputs are specific facts or quantities concerning a project. Inputs may be "yes" or "no," or numbers, for example (see Tables 1 and 2). Inputs for project parameters may supplement or inform inputs of project characteristics and major services (at block 603).

The example continues at block 602: applying answer-automation rules to the project-parameter inputs, and generating one or more answers, that may serve as project-characteristic inputs or major-services inputs (at block 603). This is one aspect of applying analysis rules to inputs. Block 602 symbolizes a way that project parameters may supplement or inform inputs of project characteristics and major services.

The example in FIG. 6 continues at block 603, receiving inputs of project characteristics and major services. These may be described as factors that can drive up costs rapidly for a service provider for example, or distinguishing factors that separate one specific project from another (see also FIGS. 3-5). A complexity matrix is unique to each type of service opportunity. The matrix for a rollout (hardware deployment) project will be different from the matrix for a server consolidation project, which in turn will be different from the matrix for a data center construction project. However, the concept of the matrix and its general principles will apply across all such examples.

The example continues at block 604, applying weighting rules and generating scores (see also the discussion of FIG. 4). Blocks 604-606 represent aspects of applying analysis rules to inputs. Consider an example from a server-consolidation project. A weighting rule for major services might be stated this way: "if providing services involving operating systems other than AIX, or some other popular versions of UNIX, then double the basic point value." In some cases, existence of an exceptional combination might invoke a rule for interaction-based modification of scores.

The example in FIG. 6 continues at block 605, applying complexity value calculation rules to scores (see also the discussion of FIG. 4). The example continues at block 606, applying project complexity rating rules and producing a rating (see also the discussion of FIGS. 4 and 5). A rating might be forced into a certain range in some cases.

As is implied by Block 606 in FIG. 6, the matrix maintains a count of the number of project characteristics that are scored as "complex," i.e., assigned a score at the high end (5 on a 5-point scale of difficulty). This counter is used, not only to enforce the business rule that three (3) or more complex characteristics result in a project complexity rating of "High", but also to modify the weighting for certain project characteristic scores. Two such examples are the effects of certain states of the Rollout-Schedule and Implementation-Type project characteristics (discussed above regarding FIG. 4).

For example, assume that Rollout Schedule has a state of "Start-Stop" (normally scored as a 3, or moderate complexity) and that at least two (2) project characteristics are scored as "complex" (5). Then having to re-start a project after a prolonged delay is significantly more difficult than it would be if the various characteristics of the project were simple, or of moderate complexity. Consequently, the Complexity Matrix increases the Rollout Schedule score from 3 to 5. This increase, of course, also increments the complexity counter, since the Rollout Schedule score was just increased to 5 (complex).

Similarly, assume that Implementation Type has a state of "Randomly Dispersed" (normally scored as a 3) and that at least 2 project characteristics are scored as complex (5). Then it is much harder for the project team to ensure high-quality performance among many randomly dispersed sites across a very wide geographic area, than it would be if the sites were in a more circumscribed region. In this case, the Complexity Matrix increases the Implementation Type score from 3 to 5. This increase also increments the complexity counter, since the Implementation Type variable was just increased to 5 (complex).

Next, block 607 represents a way of outputting at least one complexity measure that is usable in an estimation process. For example, both the project complexity rating and the computed complexity value are used to modify activity and task level estimates when project complexity is a significant cost factor. The project complexity rating is used when a gross estimate of cost is appropriate. The computed complexity value is used when more discrete estimates are required. The complexity matrix output is usable in many kinds of estimating processes. It is widely applicable in services project estimation, and could be used to derive more accurate estimates from a number of industry estimating databases. One such application is in the construction industry, which has an extensive database of time estimates for completing various construction activities and phases. The concept is applicable to any process that has an identifiable set of variables, such as product development cycles or manufacturing processes.

Regarding FIG. 6, the order of the operations in the processes described above may be varied. For example, it is within the practice of the invention for block 601, receiving input of project parameters, to occur simultaneously with block 603, receiving input of project characteristics and major services. As another example, the reference to forcing a rating could be removed from block 606. Instead, a separate path could be described for forcing a rating into the high end of the range, if a threshold value is exceeded. Those skilled in the art will recognize that blocks in FIG. 6 could be arranged in a somewhat different order, but still describe the invention. Blocks could be added to the above-mentioned diagram to describe details, or optional features; some blocks could be subtracted to show a simplified example.

This final portion of the detailed description presents a few details of an example implementation. A complexity matrix was implemented with software running on a laptop computer (sold under the trademark THINKPAD by IBM). A user interface, like the examples shown in Tables 1 and 2 and FIGS. 3, 4, and 5, was linked to spreadsheet software (the software product sold under the trademark EXCEL by Microsoft Corporation). Rules were implemented via equations in the spreadsheet software. This example complexity matrix produced computed complexity values and project complexity ratings for computer hardware deployment projects. Other hardware and software could be used. A complexity matrix could be implemented as a client-server application for example.

In conclusion, examples of solutions are provided for obtaining accurate estimates for specific projects.

One of the possible implementations of the invention is an application, namely a set of instructions (program code) executed by a processor of a computer from a computer-usable medium such as a memory of a computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer-usable medium having computer-executable instructions for use in a computer. In addition, although the various methods described are conveniently implemented in a general-purpose computer selectively activated or reconfigured by software, one of ordinary skill in the art would also recognize that such methods may be carried out in hardware, in firmware, or in more specialized apparatus constructed to perform the method.

While the invention has been shown and described with reference to particular embodiments thereof, it will be understood by those skilled in the art that the foregoing and other changes in form and detail may be made therein without departing from the spirit and scope of the invention. The appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the appended claims may contain the introductory phrases "at least one" or "one or more" to introduce claim elements. However, the use of such phrases should not be construed to imply that the introduction of a claim element by indefinite articles such as "a" or "an" limits any particular claim containing such introduced claim element to inventions containing only one such element, even when the same claim includes the introductory phrases "at least one" or "one or more" and indefinite articles such as "a" or "an;" the same holds true for the use in the claims of definite articles.

I claim:

1. A method, in a data processing system comprising a processor and a storage device, for estimating requirements for completing a project, said method comprising:
    defining, in the storage device of the data processing system, for a general kind of project, project parameters, project characteristics, and major services;
    defining, in the storage device of the data processing system, analysis rules for said general kind of project;
    providing, for a specific project, a plurality of project factors comprising project-parameter inputs, project-characteristic inputs, and major-services inputs, wherein the project factors define a complexity matrix for the specific project having a plurality of complexity measures for the plurality of project factors;
    applying, by the processor of the data processing system, said analysis rules to said plurality of project factors;
    outputting, by the processor, for said specific project, a single complexity measure for the specific project based on a combination of the plurality of complexity measures for the plurality of project factors;
    performing, by the processor, an estimate of requirements for completing the project based on the single complexity measure for the specific project; and
    outputting, by the processor, the estimate of requirements for completion of the specific project based on results of performing the estimate of requirements, wherein:
        the complexity matrix has an associated defined exceptional combination that defines a combination of a subset of project factors, the subset of project factors being less than a total number of project factors within the plurality of project factors, and a condition of the complexity measures for the combination of the subset of project factors, that forces the single complexity measure for the specific project to be a maximum complexity measure value, and
        outputting a single complexity measure for the specific project comprises:
            determining, by the processor, whether the condition of the complexity measures for the combination of the subset of project factors defined in the exceptional combination is met in the complexity matrix for the specific project; and
            forcing, by the processor, the single complexity measure for the specific project to the maximum complexity measure value in response to the condition of the complexity measures for the combination of the subset of project factors defined in the exceptional combination being met in the complexity matrix for the specific project regardless of the complexity measures associated with the other project factors not part of the subset of project factors in the exceptional combination.

2. The method of claim 1, wherein said defining analysis rules further comprises:
    defining a range of scores that reflect an item's difficulty; and
    defining a range of complexity measures.

3. The method of claim 1, wherein the estimate of requirements for completion of the specific project comprises one or more estimates selected from the group consisting of:
    resources required to complete said specific project,
    time required to complete said specific project, and
    cost of completing said specific project.

4. The method of claim 1, wherein providing the plurality of project factors further comprises:
    applying answer-automation rules to said project-parameter inputs, wherein the answer-automation rules infer an answer to a first question based on one or more already received answers to one or more other questions; and
    generating at least one answer, based on the inferred answer, that serves as at least one of said project-characteristic inputs or major-services inputs.

5. The method of claim 1, wherein said applying analysis rules further comprises applying one or more rules selected from the group consisting of:
- weighting rules,
- complexity value calculation rules, and
- project complexity rating rules.

6. The method of claim 1, wherein said applying analysis rules further comprises:
- utilizing a range of scores that reflect a difficulty of a project factor; and
- utilizing a range of complexity measures in association with said range of scores to associate a complexity measure with a project factor.

7. The method of claim 6, wherein said utilizing a range of scores further comprises:
- finding that for said project, an obligation to provide a first major service exists;
- and assigning to said first major service a score from said range of scores.

8. The method of claim 6, wherein said applying analysis rules further comprises finding the exceptional combination in the complexity matrix, based on finding that a number of project factors, less than a total number of project factors in the plurality of project factors, having scores at a high end of said range of scores, exceeds a threshold value.

9. The method of claim 8, wherein forcing the single complexity measure for the specific project to the maximum complexity measure value comprises forcing said single complexity measure into the high end of said range of complexity measures.

10. The method of claim 1, wherein said applying analysis rules further comprises:
- comparing an installation-team characteristic's state with an equipment-installation characteristic's state; and
- increasing a score associated with said installation-team characteristic if:
  - said installation-team characteristic's state is not dedicated; and
  - said equipment-installation characteristic's state is complex.

11. The method of claim 1, wherein applying said analysis rules to said plurality of project factors comprises:
- weighting the complexity measures for the project factors, wherein weighting the complexity measures converts the complexity measures to point values within a predefined range of point values.

12. The method of claim 11, wherein project factors having complexity measures with different ranges are converted to point values within the same predefined range of point values by the weighting of the complexity measures for the project factors.

13. The method of claim 11, further comprising:
- modifying a weight of a complexity measure for a project factor in the plurality of project factors in response to a combination of complexity measures for a second subset of project factors meeting a predetermined criterion.

14. The method of claim 1, wherein the project is a computer hardware deployment project, and wherein the complexity matrix has a plurality of complexity measures for a plurality of computer hardware deployment project factors.

15. The method of claim 4, wherein the one or more already received answers to one or more other questions are received from user input in response to the one or more other questions being presented to the user.

* * * * *

UNITED STATES PATENT AND TRADEMARK OFFICE
CERTIFICATE OF CORRECTION

PATENT NO.       : 7,617,117 B2                                   Page 1 of 1
APPLICATION NO.  : 10/392800
DATED            : November 10, 2009
INVENTOR(S)      : James Gilbert Starkey It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1600 days.

Signed and Sealed this

Nineteenth Day of October, 2010

David J. Kappos
*Director of the United States Patent and Trademark Office*